United States Patent
Saisho

(10) Patent No.: US 8,213,067 B2
(45) Date of Patent: Jul. 3, 2012

(54) OPTICAL SCANNING DEVICE AND IMAGE FORMING APPARATUS

(75) Inventor: Kenichiroh Saisho, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 526 days.

(21) Appl. No.: 12/189,430

(22) Filed: Aug. 11, 2008

(65) Prior Publication Data

US 2009/0059337 A1 Mar. 5, 2009

(30) Foreign Application Priority Data

Aug. 27, 2007 (JP) ................................ 2007-219206

(51) Int. Cl.
G02B 26/08 (2006.01)

(52) U.S. Cl. ................................ 359/201.1; 359/207.11

(58) Field of Classification Search ............... 359/196.1, 359/197.1, 201.1, 201.2, 205.1, 212.1, 395, 359/512, 820, 896, 207.11; 347/224–228, 347/242, 243, 246, 247, 257, 262
See application file for complete search history.

(56) References Cited

U.S. PATENT DOCUMENTS

| | | | |
|---|---|---|---|
| 4,796,963 A | 1/1989 | Yoshimura | |
| 6,067,106 A | 5/2000 | Ishibe et al. | |
| 7,253,935 B2 * | 8/2007 | Kobayashi et al. | 359/196.1 |
| 7,362,486 B2 | 4/2008 | Hayashi et al. | |
| 7,382,556 B2 * | 6/2008 | Lee | 359/820 |
| 7,428,089 B2 * | 9/2008 | Hisa | 359/212.1 |
| 7,450,142 B2 * | 11/2008 | Nakatsu | 347/242 |
| 7,649,663 B2 * | 1/2010 | Shiraishi | 359/204.1 |
| 7,766,491 B2 * | 8/2010 | Shiraishi | 353/99 |
| 7,817,178 B2 * | 10/2010 | Bush et al. | 347/243 |
| 2005/0057636 A1 * | 3/2005 | Mori | 347/140 |
| 2005/0179771 A1 | 8/2005 | Ueda | |
| 2006/0187294 A1 | 8/2006 | Saisho et al. | |
| 2006/0284968 A1 | 12/2006 | Hayashi et al. | |
| 2006/0289731 A1 * | 12/2006 | Shimomura et al. | 250/234 |
| 2007/0211326 A1 | 9/2007 | Saisho et al. | |
| 2007/0253048 A1 | 11/2007 | Sakai et al. | |
| 2008/0025759 A1 | 1/2008 | Ichii et al. | |
| 2008/0055692 A1 | 3/2008 | Saisho et al. | |

(Continued)

FOREIGN PATENT DOCUMENTS

JP 63-49725 3/1988

(Continued)

OTHER PUBLICATIONS

U.S. Appl. No. 12/024,505, filed Feb. 1, 2008, Naoto Watanabe et al.

(Continued)

*Primary Examiner* — Frank Font
(74) *Attorney, Agent, or Firm* — Oblon, Spivak, McClelland, Maier & Neustadt, L.L.P.

(57) ABSTRACT

A temperature of a scanning optical system is different from a temperature of a light source when an optical scanning device is in operation, and when the both temperatures are assumed to be equal, a diffractive surface of a diffractive optical element is set according to a magnitude relationship between both temperatures when the optical scanning device is in operation such that a deviation amount of an in-focus position of the light flux by the diffractive optical element becomes larger or smaller than a deviation amount for canceling a deviation amount of an in-focus position of the light flux by the scanning optical system.

15 Claims, 11 Drawing Sheets

U.S. PATENT DOCUMENTS

| | | |
|---|---|---|
| 2008/0068689 A1 | 3/2008 | Saisho et al. |
| 2008/0068693 A1 | 3/2008 | Hayashi et al. |
| 2011/0069137 A1* | 3/2011 | Suzuki et al. ............... 347/256 |

FOREIGN PATENT DOCUMENTS

| | | |
|---|---|---|
| JP | 10-333070 | 12/1998 |
| JP | 2002-287062 | 10/2002 |
| JP | 2004-126192 | 4/2004 |
| JP | 2005-258392 | 9/2005 |
| JP | 2006-235069 | 9/2006 |
| JP | 2006-301299 | 11/2006 |

OTHER PUBLICATIONS

Office Action issued Oct. 6, 2011, in Japanese Patent Application No. 2007-219206.

* cited by examiner

TEMPERATURE

DISTANCE FROM ROTATION CENTER
OF POLYGON MIRROR

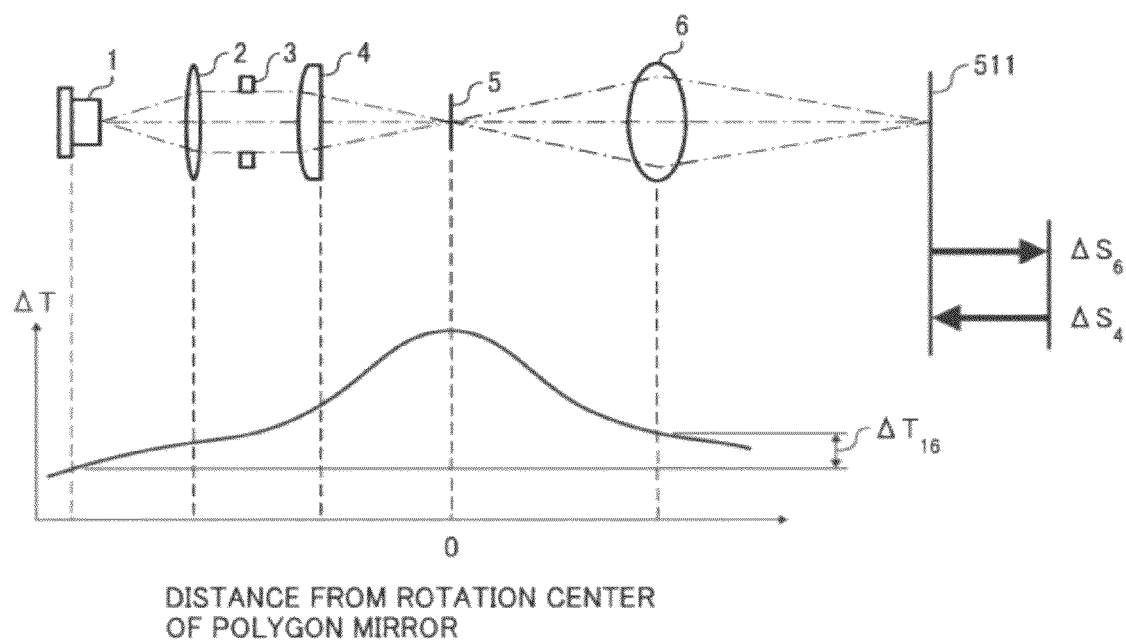

DISTANCE FROM ROTATION CENTER
OF POLYGON MIRROR

DISTANCE FROM ROTATION CENTER
OF POLYGON MIRROR

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-219206 filed in Japan on Aug. 27, 2007.

BACKGROUND OF THE INVENTION

1. Field of the Invention

The present invention relates to an optical scanning device and an image forming apparatus, and more particularly, to an optical scanning device that scans a scanning surface by a light flux and an image forming apparatus including the optical scanning device.

2. Description of the Related Art

Recently, while prices of image forming apparatuses such as an optical printer, a digital copier, and an optical plotter have become less expensive, a high stability for temperature change has been required for these apparatuses. These image forming apparatuses include an optical scanning device that scans a scanning surface by a light flux from a light source.

With the advent of a high precision machining technique, as a method of achieving a high stability, a low price, and a reduced number of components, the use of an optical element (a diffractive lens, a phase shifter, a sub-wavelength structure (SWS) element, and the like) having a fine shape is considered.

When the diffractive lens is used for the optical scanning device, an advanced function and multiple functions can be achieved with a small number of components, and thus, the diffractive lens is expected to achieve a high precision of an optical characteristic as well as a great effect for the reduction in size of the optical scanning device.

For example, Japanese Patent Application Laid-open No. 2005-258392 discloses an optical scanning device including: a light source formed of a semiconductor laser; a coupling optical system that couples a light flux from the light source; a first optical system that converts the light flux from the coupling optical system in a main scanning direction into a parallel light and that converges the light flux in a sub-scanning direction onto a deflecting unit; a deflecting unit that deflects the light flux from the first optical system in the main scanning direction; and a scanning optical system that concentrates the light flux deflected by the deflecting unit, in which, materials of all lenses configuring the coupling optical system are resin, and at least one surface of the lenses is formed with a diffractive optical surface.

Japanese Patent Application Laid-open No. 2002-287062 discloses a laser scanning apparatus including: a laser light source that emits a laser beam; a deflecting unit that deflects an incoming laser beam into a main scanning direction; a light-source optical system that converts the laser beam, in the main scanning direction, emitted from the laser light source into substantially a parallel light and that concentrates the laser beam in a sub-scanning direction near a deflecting surface of the deflecting unit; and a scanning optical system that concentrates again the laser beam deflected by the deflecting unit, in which the light-source optical system is formed of one optical element configured by resin, and the optical element includes at least one surface of a reflecting surface having no axis of rotation symmetry, and two surfaces of transmitting surfaces (of which the two surfaces are both diffractive surfaces, and on the two diffractive surfaces, changes in diffractive angle at the time of a wavelength change are configured to be opposite to each other).

Japanese Patent Application Laid-open No. 2004-126192 discloses an optical scanning device including: a light source unit; an optical unit that guides a light flux from the light source unit to an optical deflecting unit; an imaging optical system that guides the light flux from the optical deflecting unit to a scanning surface; and the scanning surface being optically scanned based on a rotary operation of the optical deflecting unit, in which the optical unit has a diffracting unit on one or more surfaces, and a specific expression including a focal length, a spot diameter, an oscillation wavelength, a power, and a dispersion value satisfies a specific condition.

A diffractive lens having a trace step corresponding to a phase difference of equal to or more than $2\pi$ can impart, similar to a refractive lens, functions of refracting a light flux, concentrating light, and so on. A property of the diffractive lens, which differs from that of the refractive lens, includes a strong negative dispersion. When the property of the diffractive lens and a wavelength change of a light source concurrently with a temperature change of an optical system are appropriately combined, a so-called temperature compensating function can be realized.

The temperature compensating function can be realized when a change in optical characteristic resulting from the temperature change of the optical system and the wavelength change of the light source are generated in good balance. Accordingly, when a laser light source, which is represented by a semiconductor laser diode (LD), is used, a deterioration of geometric aberration resulting from a wavelength variance of the light source, such as a wavelength difference depending on each light source element, a wavelength transition (mode hopping) during emission, a wavelength difference between light-emitting units in an array element need be taken into consideration. This is considered to be an inevitable issue caused as a result of bringing an optical wave characteristic into a geometric aberration correction.

As described above, when the temperature change is generated, the diffractive lens having the temperature compensating function realizes its function by balancing: (1) the negative dispersion characteristic of the diffractive lens caused by the wavelength variation of the light source; and (2) a focus deviation caused by a thermal expansion of the optical elements. Particularly, a dominant factor in (2) is the thermal expansion of a scanning lens included in the scanning optical system. It can therefore be said that designing the temperature compensating function of the diffractive lens is achieved by balancing the negative dispersion characteristic and an amount of the temperature change of the scanning optical system.

In an actual optical scanning device, the temperature change is not generated evenly within the apparatus. The reason for this is that heat sources are independently operated, i.e.: (A) heating resulting from driving the light source; (B) heating resulting from driving the deflecting unit; and (c) heating resulting from a heat source outside of the optical scanning device.

Particularly, the heating in (B) is generated for driving the deflecting unit at high speed, and is the most dominant heating of all the temperatures within the optical scanning device. Generally, the heating in (A) is generated by driving an electric circuit, and thus, the amount of heating is much smaller as compared to that in (B).

Thus, resulting from the independent heat sources and the difference in amount among these heat sources, an uneven temperature distribution is generated within the apparatus while the optical scanning device is driven. In practice, the temperature distribution is such that at the center of a deflecting unit having the largest amount of heating, the heat is diffused within the optical scanning device. Such a temperature distribution is a complicated phenomenon relating to a shape of a casing and an air current, and thus, estimating in advance at the time of optical design is very difficult. This results in a current situation such that when designing the diffractive lens having the temperature compensating function, a specific pattern is merely estimated, e.g., to rely on "when the temperature is changed evenly within the optical scanning device".

The generation of the uneven temperature distribution means a generation of a temperature difference, i.e., the temperature is higher near the deflecting unit, and the temperature is lower in the optical element apart from the deflecting unit. The diffractive lens having the temperature compensating function is so designed to estimate that the wavelength change of the light source and the change resulting from the temperature of the scanning optical system are balanced, and thus, the generation of the uneven temperature distribution breaks down the balance.

SUMMARY OF THE INVENTION

It is an object of the present invention to at least partially solve the problems in the conventional technology.

According to an aspect of the present invention, there is provided an optical scanning device that scans a scanning surface by a light flux. The optical scanning device includes a light source that emits a light flux; a pre optical system that is located on an optical path of the light flux from the light source and that includes at least one diffractive optical element having a diffractive surface on at least one side; a deflecting unit that deflects the light flux output from the pre optical system; and a scanning optical system that focuses the light flux deflected by the deflecting unit on the scanning surface. A first temperature that is temperature of the scanning optical system is different from a second temperature that is temperature of the light source when the optical scanning device is in operation, and when the first and the second temperatures are assumed to be equal, the diffractive surface is set according to a magnitude relationship between the first temperature and the second temperature when the optical scanning device is in operation such that a deviation amount of an in-focus position of the light flux by the diffractive optical element becomes larger or smaller than a deviation amount for canceling a deviation amount of an in-focus position of the light flux by the scanning optical system.

Furthermore, according to another aspect of the present invention, there is provided an image forming apparatus including at least one image carrier; and at least one optical scanning device that scans the image carrier by a light flux including image information. The optical scanning device includes a light source that emits a light flux, a pre optical system that is located on an optical path of the light flux from the light source and that includes at least one diffractive optical element having a diffractive surface on at least one side, a deflecting unit that deflects the light flux output from the pre optical system, and a scanning optical system that focuses the light flux deflected by the deflecting unit on the scanning surface. A first temperature that is temperature of the scanning optical system is different from a second temperature that is temperature of the light source when the optical scanning device is in operation, and when the first and the second temperatures are assumed to be equal, the diffractive surface is set according to a magnitude relationship between the first temperature and the second temperature when the optical scanning device is in operation such that a deviation amount of an in-focus position of the light flux by the diffractive optical element becomes larger or smaller than a deviation amount for canceling a deviation amount of an in-focus position of the light flux by the scanning optical system.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 11 and 12 are schematic diagrams for explaining a temperature compensating function of the diffractive lens in FIG. 2;

FIG. 13 is a table for explaining a specific example of a focus deviation amount;

DETAILED DESCRIPTION OF THE PREFERRED EMBODIMENTS

Exemplary embodiments of the present invention are explained in detail below with reference to the accompanying drawings.

Figure 1:
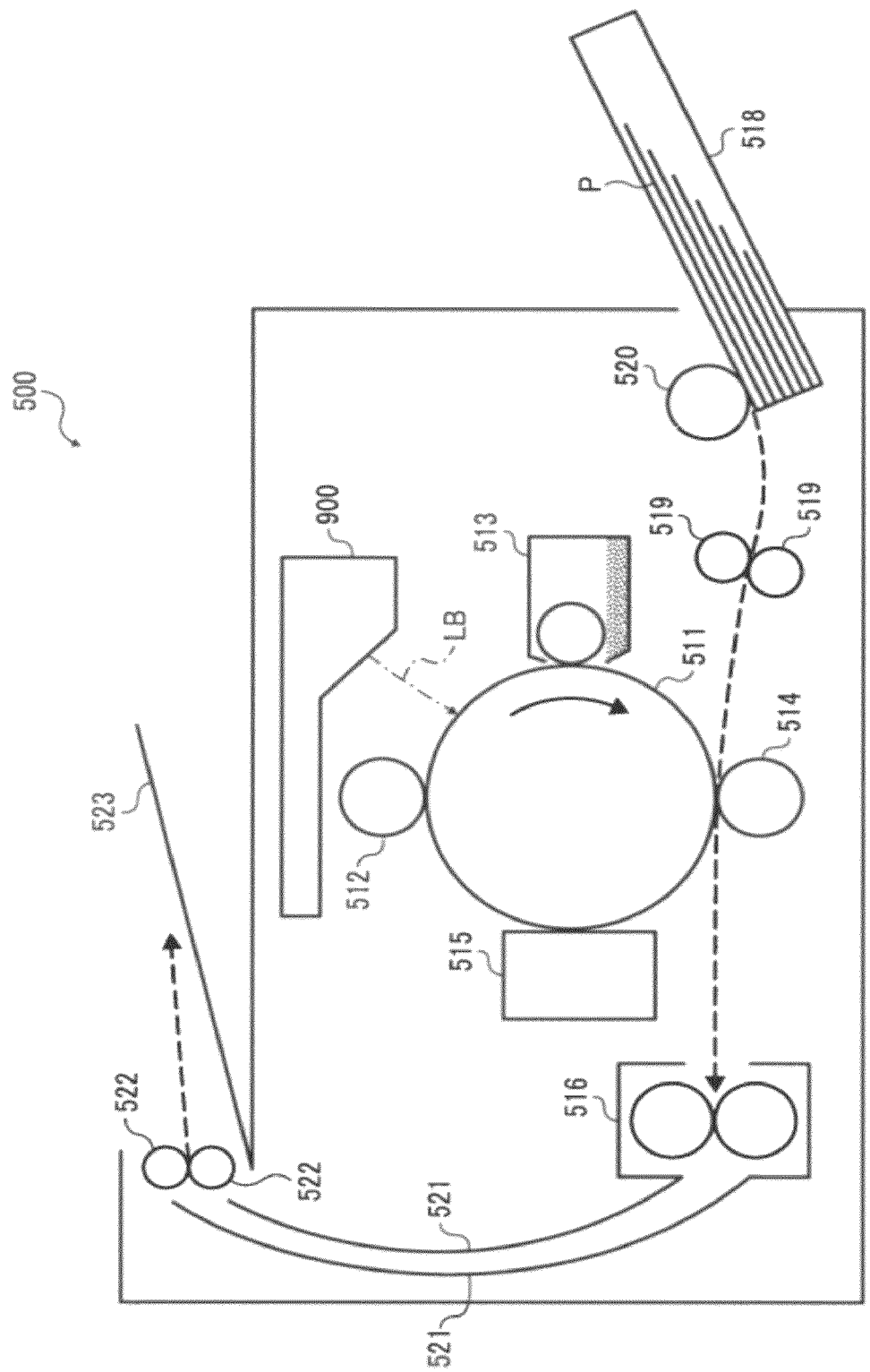
FIG. 1 is a schematic diagram for explaining a configuration of a laser printer according to an embodiment of the present invention.

FIG. 1 depicts a schematic configuration of a laser printer 500 that is an image forming apparatus according to an embodiment of the present invention. The laser printer 500 includes a photosensitive drum 511, a charging roller 512, a developing unit 513, a transfer roller 514, a cleaning unit 515, a fixing unit 516, an optical scanning device 900, a cassette 518, a registration roller pair 519, a paper feed roller 520, a paper-discharging roller pair 522, and a tray 523.

The photosensitive drum 511, which is an image carrier, is formed on its surface with a photosensitive layer having a photoconductivity. That is, the surface of the photosensitive drum 511 is a scanning surface.

The charging roller 512, the developing unit 513, the transfer roller 514, and the cleaning unit 515 are each located near the surface of the photosensitive drum 511. Along a rotation direction (an arrow direction in FIG. 1) of the photosensitive drum 511, the components are located in the order of the charging roller 512, the developing unit 513, the transfer roller 514, and the cleaning unit 515.

The charging roller 512 is a charging means for evenly charging the surface of the photosensitive drum 511. For the charging means, a "corona charger" can also be used.

The optical scanning device 900 scans the surface of the photosensitive drum 511 charged by the charging roller 512 by a light (scanning light) LB that is modulated based on image information from an upper-level device (for example, a personal computer (PC)). As a result of the optical scanning by the optical scanning device 900, a charge is lost only in a portion irradiated with the light on the surface of the photosensitive drum 511, and thereby, a latent image (an electrostatic latent image) corresponding to the image information is formed. The latent image is a so-called negative latent image, and moves in a direction of the developing unit 513 concurrently with a rotation of the photosensitive drum 511. A configuration of the optical scanning device 900 is described later.

The developing unit 513 includes a toner cartridge stored with a toner, and deposits the toner only to the portion irradiated with the light on the surface of the photosensitive drum 511. That is, the developing unit 513 deposits the toner to the latent image formed on the surface of the photosensitive drum 511 to visualize the image information. The latent image where the toner is deposited (for convenience, hereinafter, "toner image") moves in the direction of the transfer roller 514 concurrently with the rotation of the photosensitive drum 511.

The cassette 518 is detachable from and attachable to a main body of the laser printer 500, and contains therein transfer paper P, as an object to be transferred. Near the cassette 518, the paper feed roller 520 is located. The paper feed roller 520 takes out one sheet of the transfer paper P, which is placed on top, contained in the cassette 518.

The registration roller pair 519 is located near the transfer roller 514, and catches a tip end of the transfer paper P taken out by the paper feed roller 520. The registration roller pair 519 sends the transfer paper P in a gap between the transfer roller 514 and the photosensitive drum 511 with a timing at which the toner image on the photosensitive drum 511 moves to a transfer position. The sent transfer paper P is superimposed with the toner image by the transfer roller 514, and as a result, the toner image is electrostatically transferred.

The transfer paper P to which the toner image is transferred is sent to the fixing unit 516, is fixed with the toner image by the fixing unit 516, passes through a paper feed path 521, and is discharged on the tray 523 by the paper-discharging roller pair 522.

The surface of the photosensitive drum 511 after the toner image is transferred thereon is cleaned by the cleaning unit 515 to eliminate residual toner, paper dust, or the like.

Figure 2:
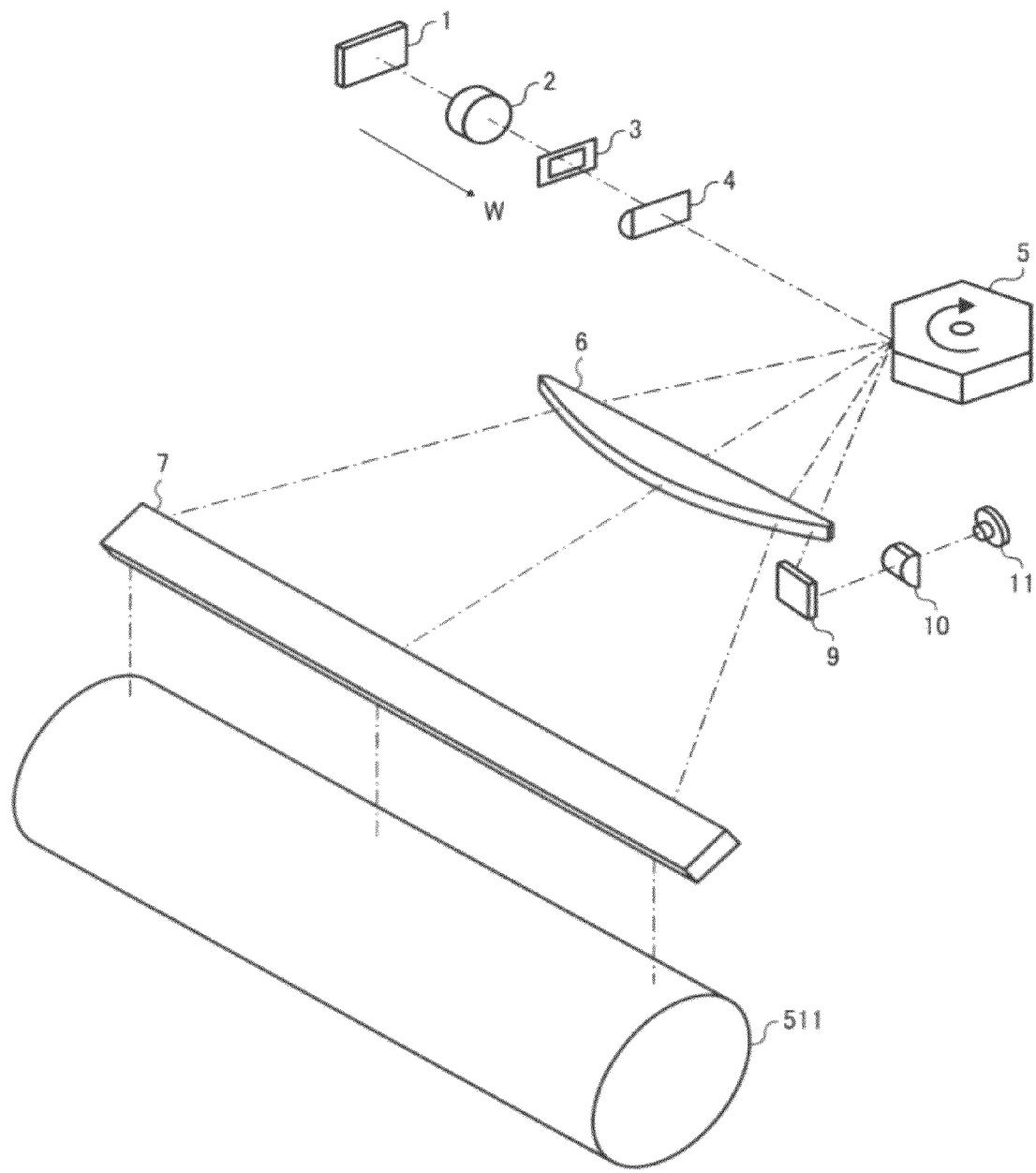
FIG. 2 is a perspective view of a schematic configuration of an optical scanning device in FIG. 1.

The optical scanning device 900 includes a light source 1, a coupling lens 2, an aperture plate 3, a diffractive lens 4, a polygon mirror 5, a scanning lens 6, a fold mirror 7, a synchronous mirror 9, a synchronous lens 10, and a synchronization detecting sensor 11, as shown in FIG. 2 as one example.

Figure 3:
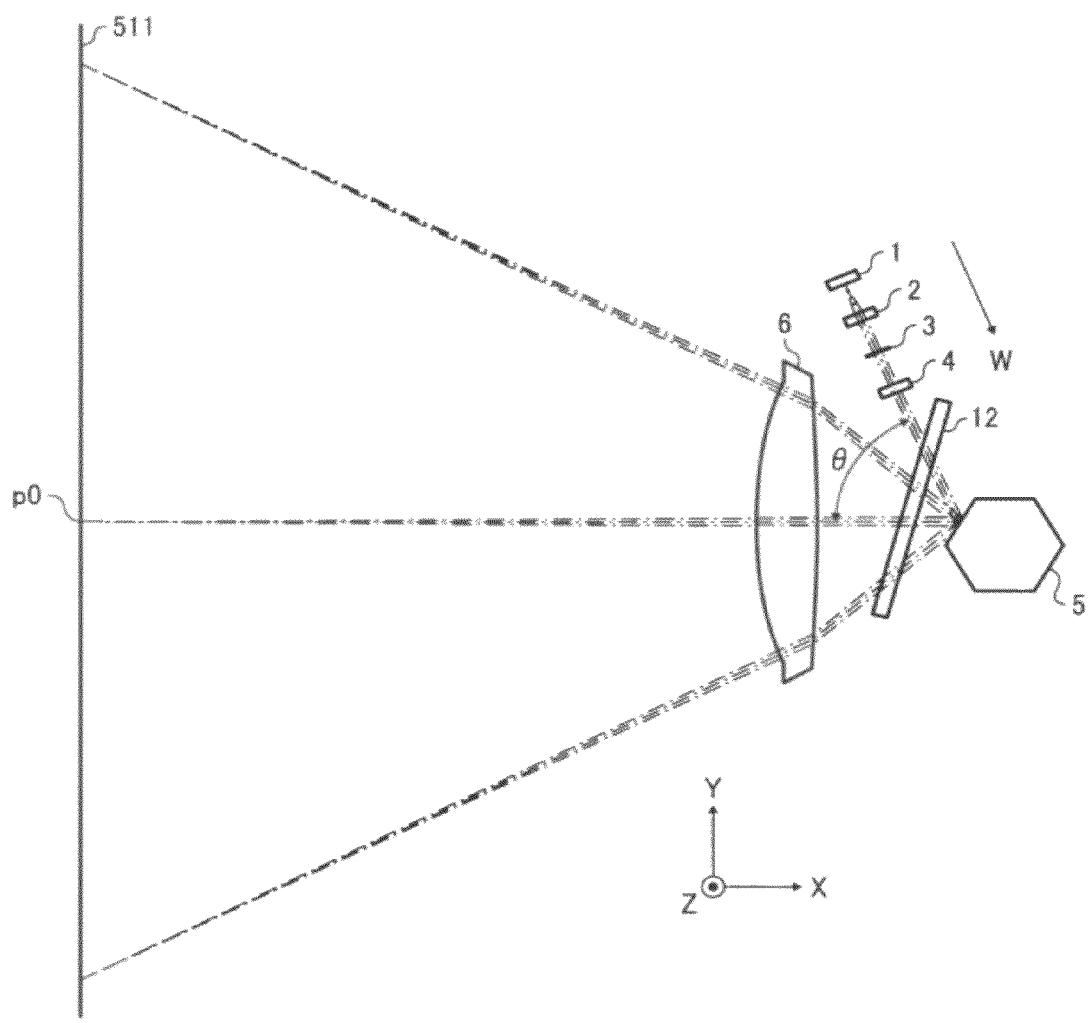
FIG. 3 is a plan view of a schematic configuration of the optical scanning device in FIG. 1.

As shown in FIG. 3, in this specification, in an XYZ three-dimensional rectangular coordinate system, a direction along a longitudinal direction of the photosensitive drum 511 is a Y-axis direction, and that along an optical axis of the scanning lens 6 is an X-axis direction. In FIG. 3, for convenience, illustration of the fold mirror 7, the synchronous mirror 9, the synchronous lens 10, and the synchronization detecting sensor 11 will be omitted.

The light source 1, as one example, has a vertical-cavity-surface-emitting laser (VCSEL) of which the oscillation wavelength is designed to be 655 nanometers. The surface-emitting laser has a characteristic such that when a temperature increases by 1° C. from a reference temperature ($T_0$=25° C.), the oscillation wavelength is deviated by 0.2 nanometer only to a long wavelength side. For convenience, an advancing direction of a light flux from the light source 1 toward the polygon mirror 5 is defined as a "W direction", below.

The coupling lens 2 has a focal length of about 27 millimeters, and converts the light flux emitted from the light source 1 to substantially a parallel light.

As one example, the coupling lens 2 is a lens made of glass. In this case, the glass has a physical property that a refractive index is 1.515141 for a light of 655 nanometers under a reference temperature, and when the temperature increases from the reference temperature by 20° C., the refractive index is 1.515062 and a linear expansion coefficient is $7.5 \times 10^{-6}$/K, for example.

In the coupling lens 2, both an incidence surface and an output surface are a non-spherical surface, and thus, a wavefront aberration of the coupled light flux is sufficiently corrected.

The light source 1 and the coupling lens 2 are held by a holding member (not shown) using a material of which the linear expansion coefficient is $2.4 \times 10^{-5}$/K.

The aperture plate 3, for example, has a rectangular-shaped aperture having a width of 2.3 millimeters in a direction corresponding to a main scanning direction (in this case, a direction perpendicular both to the W direction and a Z-axis direction) and a width of 2.4 millimeters in a direction corresponding to a sub scanning direction (in this case, the Z-axis direction), shapes the light flux via the coupling lens 2, and determines a beam spot diameter on the photosensitive drum 511.

The diffractive lens 4 images the light flux passing through the aperture of the aperture plate 3 near a deflective/reflective surface of the polygon mirror 5 regarding a direction (in this case, the Z-axis direction) corresponding to the sub-scanning direction.

The diffractive lens 4 is a lens which has a thickness of 2 millimeters and which is made of resin. The resin, as one example, has a physical property that a refractive index is 1.527257 for a light of 655 nanometers under a reference temperature, and when the temperature increases from the reference temperature by 20° C., the refractive index is 1.525368 and a linear expansion coefficient is $7.0 \times 10^{-5}$/K. A focal length regarding a direction corresponding to the sub-scanning direction of the diffractive lens 4 (in this case, the Z-axis direction) is about 48 millimeters.

Figure 4A:
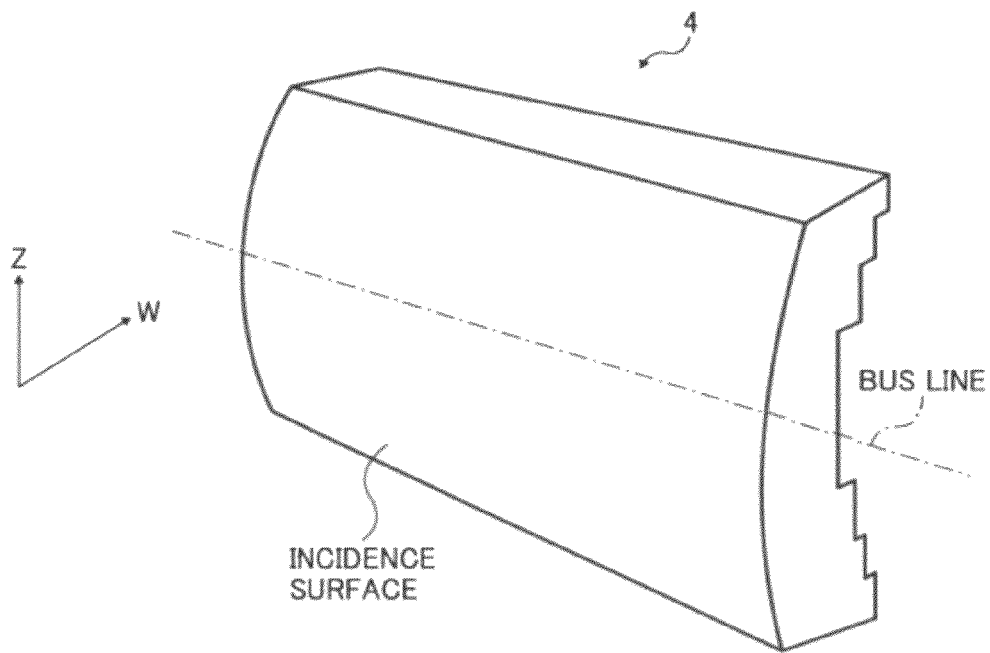
FIG. 4A is a schematic diagram for explaining an incidence surface of a diffractive lens in FIG. 2.

As shown in FIG. 4A, the incidence surface of the diffractive lens 4 is a cylindrical surface of which the close-axis-curvature radius in a direction corresponding to the main scanning direction is ∞ and the close-axis-curvature radius in a direction corresponding to the sub-scanning direction is 24.78 millimeters.

Figure 4B:
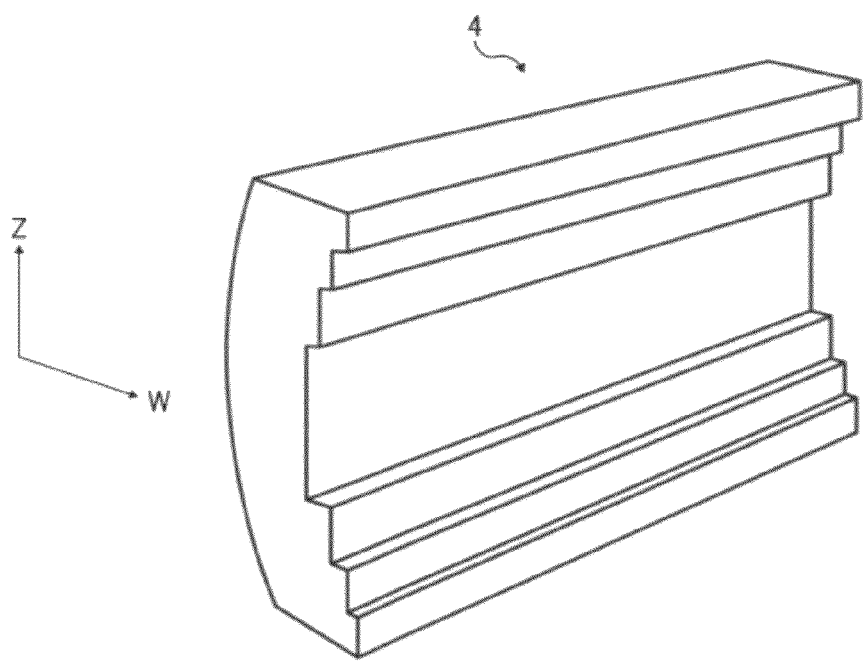
FIG. 4B is a schematic diagram for explaining an output surface of the diffractive lens in FIG. 2.

The output surface of the diffractive lens 4 is a diffractive surface having a plurality of plane regions, divided by steps, vertical to an optical axis, as shown in FIG. 4B. The step having one step can impart a phase difference of $2\pi$ regarding the light flux. In this case, the output surface of the diffractive lens 4 has a 44-step shape of which the one-step difference is about 1.2 micrometers. That is, the output surface of the diffractive lens 4 has a multi-step shape.

Figure 5:
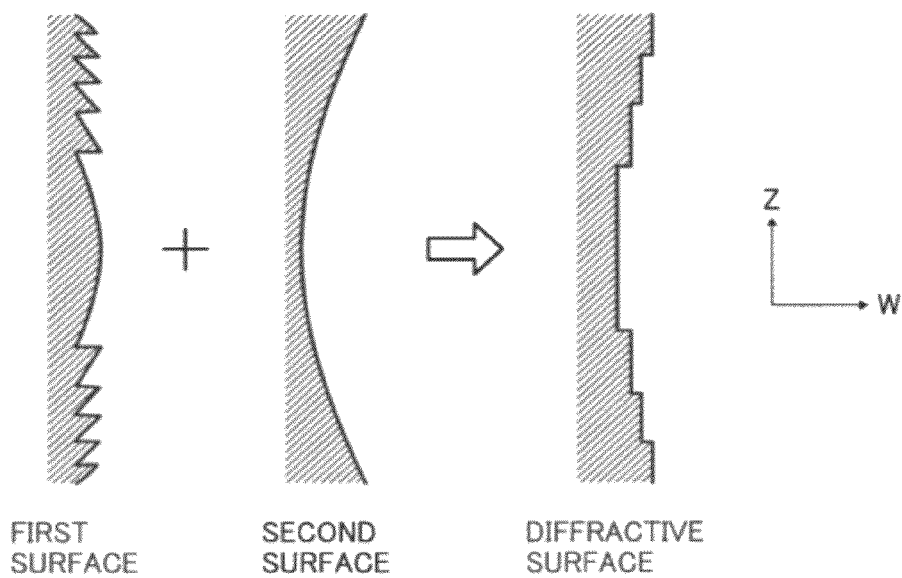
FIG. 5 is a schematic diagram for explaining a diffractive surface of the diffractive lens in FIG. 2.

The diffractive surface has a surface shape in which a surface having a diffracting effect (hereinafter, "first surface") and that having a reflecting effect (hereinafter, "second surface") are synthesized, as shown in FIG. 5.

The second surface is a concave cylindrical surface of which the curvature radius is 17.6 millimeters. Alternatively, the first surface has a shape obtained by folding a convex Fresnel surface having the same curvature radius as that of the second surface by an appropriate step and pitch. Thereby, a power of the first surface is canceled by a power of the second surface, and thus, in the output surface of the diffractive lens 4, both the direction corresponding to the main scanning direction and the direction corresponding to the sub-scanning direction are non-power. The power of the first surface corresponds to an amplitude of a power variation resulting from a negative dispersion at the time of a wavelength variation, and is determined by the number of steps in the multi-step shape. The details of the diffractive surface of the diffractive lens 4 are described later.

An optical system located on an optical path between the light source 1 and the polygon mirror 5 is also called a pre optical system. In the present embodiment, the pre optical system is configured by the coupling lens 2, the aperture plate 3, and the diffractive lens 4.

The polygon mirror 5, as one example, has a six-sided mirror of which the radius of an inscribed circle is 13 millimeters and of which the respective mirrors are deflective/reflective surfaces. The polygon mirror 5 is surrounded by a soundproof glass 12 having a thickness of 1.9 millimeters. Glass made of a material of the soundproof glass 12 is the same as that of the coupling lens 2.

The scanning lens 6 is so designed to convert the light flux deflected by the polygon mirror 5 to a substantially equal speed of motion relative to the surface of the photosensitive drum 511 and to constantly concentrate the light flux onto the surface of the photosensitive drum 511.

The scanning lens 6 is a lens which has a thickness of 13.5 millimeters and which is made of resin. The resin has the same physical property as a material of the diffractive lens 4.

The scanning lens 6 has an incidence surface of which the close-axis-curvature radius Rm in a direction corresponding to the main scanning direction (in this case, the Y-axis direction) is 179 millimeters and the close-axis-curvature radius Rs in a direction corresponding to the sub-scanning direction (in this case, the Z-axis direction) is 96.40 millimeters, and an output surface of which the close-axis-curvature radius Rm in a direction corresponding to the main scanning direction is −157.26 millimeters and the close-axis-curvature radius Rs in a direction corresponding to the sub-scanning direction is −19.33 millimeters, for example. A transverse magnification in the direction corresponding to the sub-scanning direction is about −3.73 times.

Both surfaces (the incidence surface and the output surface) of the scanning lens 6 are non-spherical surfaces. The both surfaces are special surfaces such that a direction corresponding to the main scanning direction is a non-circular arc shape and a curvature within a so-called sub-scanning cross section (in this case, a virtual cross section parallel to an optical axis and a direction corresponding to the sub-scanning direction) changes according to a direction corresponding to the main scanning direction.

The fold mirror 7 folds an optical path of the light flux via the scanning lens 6 toward the surface of the photosensitive drum 511. This forms a beam spot on the surface of the photosensitive drum 511. The beam spot moves to a longitudinal direction of the photosensitive drum 511 concurrently with a rotation of the polygon mirror 5. That is, the scanning is performed over the photosensitive drum 511.

The optical system located on the optical path between the polygon mirror 5 and the photosensitive drum 511 is also called a scanning optical system. In the present embodiment, the scanning optical system is configured by the scanning lens 6 and the fold mirror 7. Between the fold mirror 7 and the photosensitive drum 511, a dust-proof glass (not shown) having a thickness of 1.9 millimeters is located. The dust-proof glass is made of glass having the same physical property as that of the soundproof glass.

A rotation center of the polygon mirror 5 and an origin of the incidence surface of the scanning lens 6 (an optical axis position on the incidence surface) are kept apart by 43 millimeters in an optical axis direction (in this case, the X-axis direction) and by 6.35 millimeters in a direction corresponding to the main scanning direction (in this case, the Y-axis direction).

An origin of the output surface of the scanning lens 6 (an optical axis position of the output surface) and the surface of the photosensitive drum 511 are kept apart by 176 millimeters in the optical axis direction (in this case, the X-axis direction).

An angle ($\theta$ in FIG. 3) formed by the W direction and the advancing direction of the light flux reflected toward a position (which is at numeral p0 in FIG. 3) of an image height 0 on the surface of the photosensitive drum 511 by the deflective/reflective surface of the polygon mirror 5 is 68 degrees.

Figure 6:
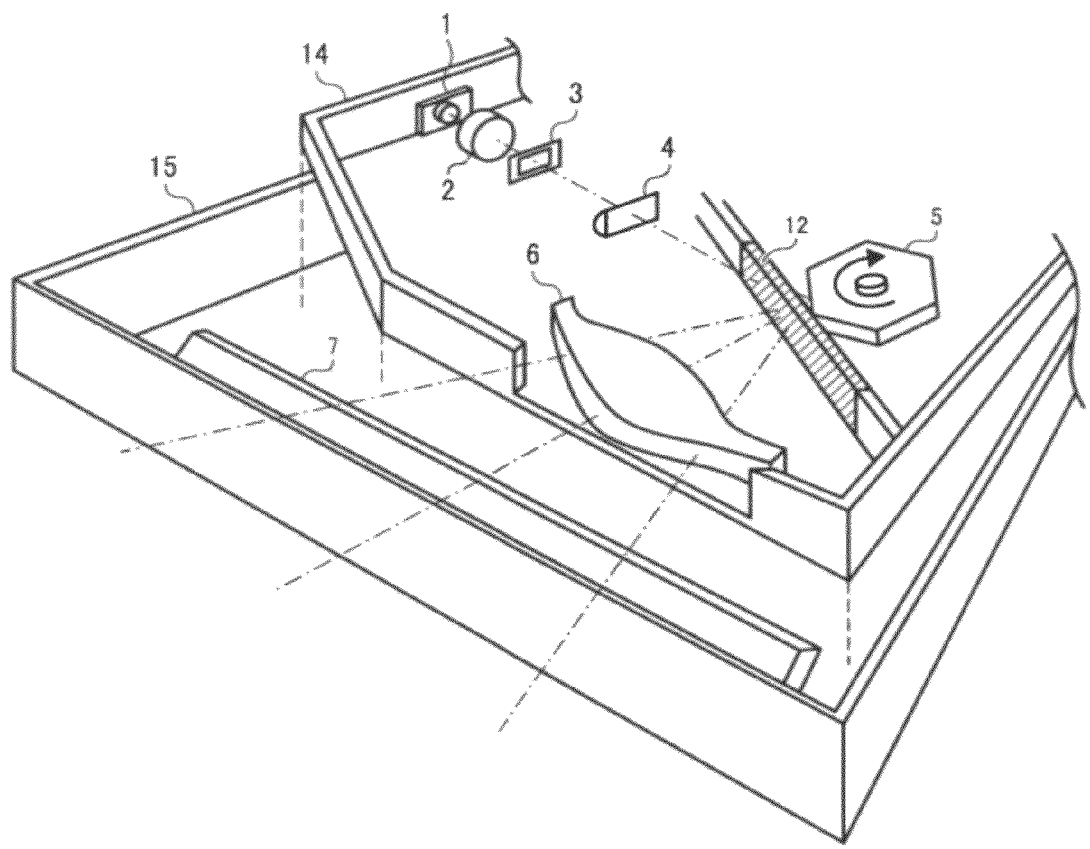
FIG. 6 is a schematic diagram for explaining casings.

In the present embodiment, the optical scanning device 900 includes two casings (a first casing 14 and a second casing 15), as shown in FIG. 6. The first casing 14 includes therein the light source 1, the coupling lens 2, the aperture plate 3, the diffractive lens 4, the polygon mirror 5, the scanning lens 6, the synchronous mirror 9, the synchronous lens 10, and the synchronization detecting sensor 11. The aperture plate 3 can be integrated with the first casing 14 or can be assembled as an element. The light source 1 is press-fitted into a hole formed on a wall surface of the first casing 14. The second casing 15 contains the first casing 14 and the fold mirror 7.

Any one of the coupling lens 2, the diffractive lens 4, and the scanning lens 6 is applied in a required location an adhesive agent represented by a UV curing resin, positioned by a jig or the like, and thereafter, fixed by a method such as a UV irradiation for assembly. When this assembly is implemented, a light flux emitted from the first casing 14 is monitored and the monitored light flux is fed back. Thereby, an error can be adjusted and absorbed before the adhesive agent is cured.

Figure 7:
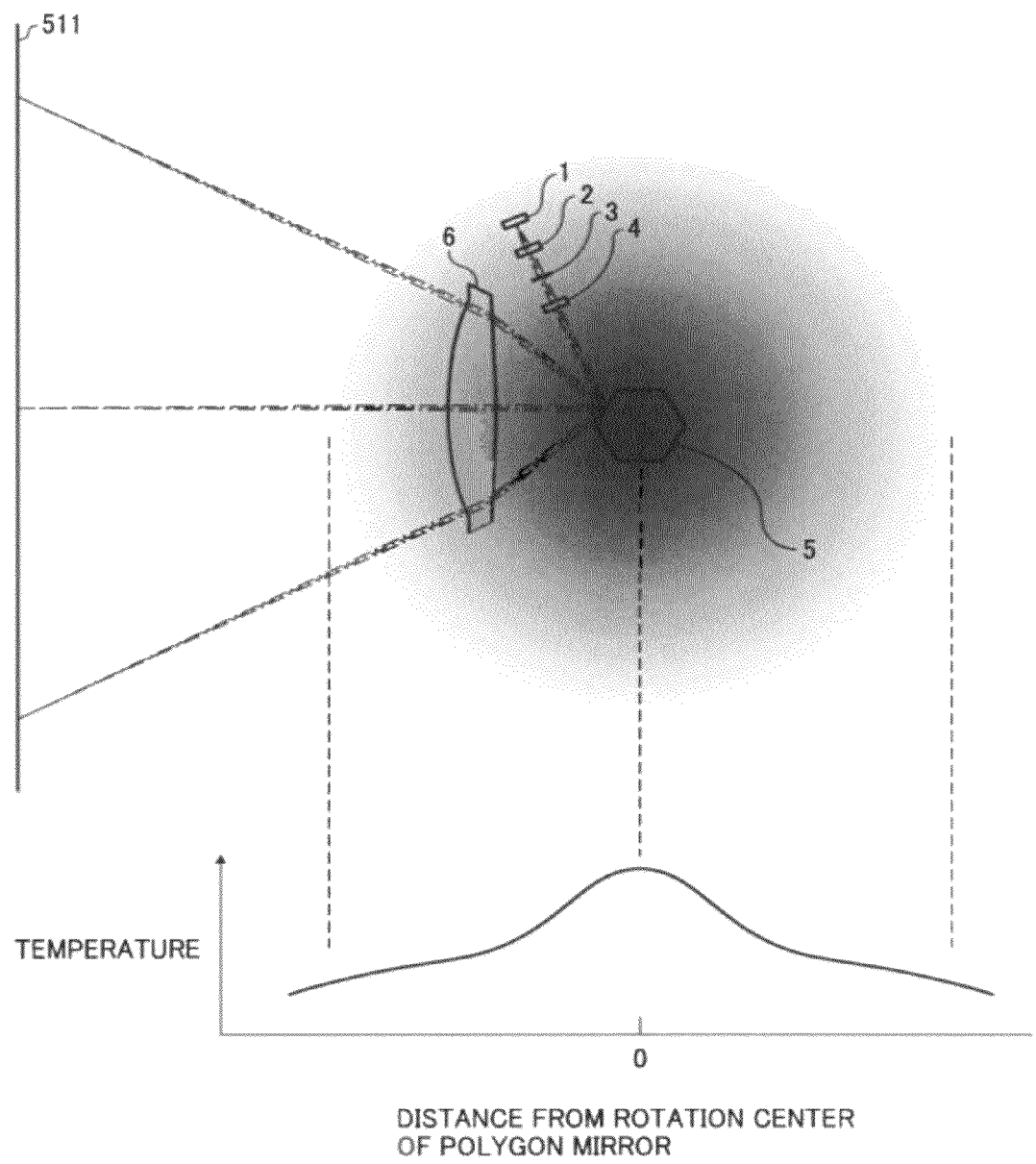
FIG. 7 is a schematic diagram for explaining an uneven temperature distribution.
Figure 8:
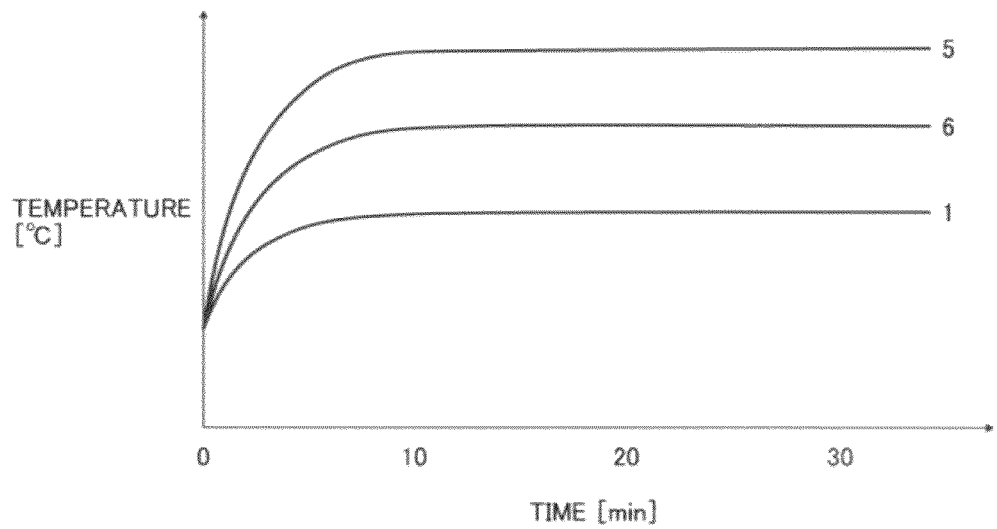
FIG. 8 is a graph for explaining temperature changes of a light source, a polygon mirror, and a scanning lens.

As described above, when the optical scanning device is in operation, the polygon mirror 5 is the most dominant heating regarding the temperatures within the optical scanning device, and as shown in FIG. 7, the temperature is so distributed that around the polygon mirror 5, the heat diffuses toward a circumference within the optical scanning device. That is, regarding the temperature of the optical element, the closer to the polygon mirror 5, the higher the temperature. As one example, FIG. 8 is a graph showing temperature changes in the light source 1, the polygon mirror 5, and the scanning lens 6. Thus, it is understood that even when the temperature change is saturated, an uneven temperature distribution remains.

When the temperature increases, a focal length of a general refractive lens becomes long because of an influence of a thermal expansion and a material dispersion resulting from a longer wavelength of a light-source wavelength. That is, the power of the refractive lens is decreased. This leads to the generation of deviation of the in-focus position (focus position deviation) in an optical system including the refractive lens. Particularly, in a refractive lens made of resin, an expansion amount is large, and thus, a deviation amount of the focus position (hereinafter, "focus deviation amount") becomes very large.

On the other hand, the diffractive lens has a characteristic (a negative dispersion characteristic) that when the light-source wavelength becomes a longer wavelength, the focal length becomes shorter.

Accordingly, when the diffractive lens is introduced to an optical system including the refractive lens, and a diffractive surface so configured to compensate the focus deviation amount resulting from the diffractive lens at the time of the temperature increase is formed on the diffractive lens, an optical system robust for the temperature change can be realized.

However, the uneven temperature distribution is a complicated phenomenon affected by a use condition, environment or the like of the optical scanning device, and thus, the uneven temperature distribution cannot be uniquely assumed from design of an estimated optical scanning device. Accordingly, as shown in FIG. 9, a diffractive lens 4' having a temperature compensating function is conventionally so designed that a "state that the temperature distribution is even" is assumed, i.e., "all optical elements similarly change in temperature".

Figure 9:
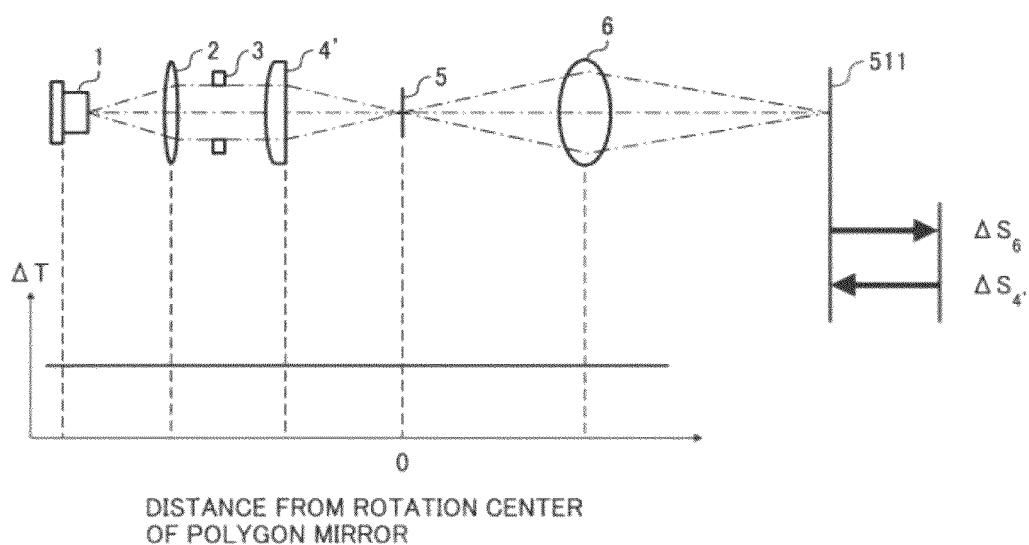
FIGS. 9 and 10 are schematic diagrams for explaining a temperature compensating function of a conventional diffractive lens.

In FIG. 9, provided that due to a temperature change $\Delta T$, a thermal expansion of the scanning lens 6 and a wavelength shift in the light source 1 are generated, and in this condition, $\Delta S_6$ denotes a focus deviation amount resulting from power decrease of the scanning lens 6 at this time, and $\Delta S_{4'}$ denotes a focus deviation amount resulting from the negative dispersion characteristic of the diffractive lens 4'. FIGS. 9 to 12 depict the sub-scanning cross section, and for convenience, illustration of the fold mirror 7 will be omitted.

Accordingly, when the diffractive lens 4' is so designed that $\Delta S_6 + \Delta S_{4'}$ is almost 0, a so-called "temperature compensation" in which the focus position deviation resulting from the temperature change is suppressed is established. This is a conventional temperature compensation.

Figure 10:
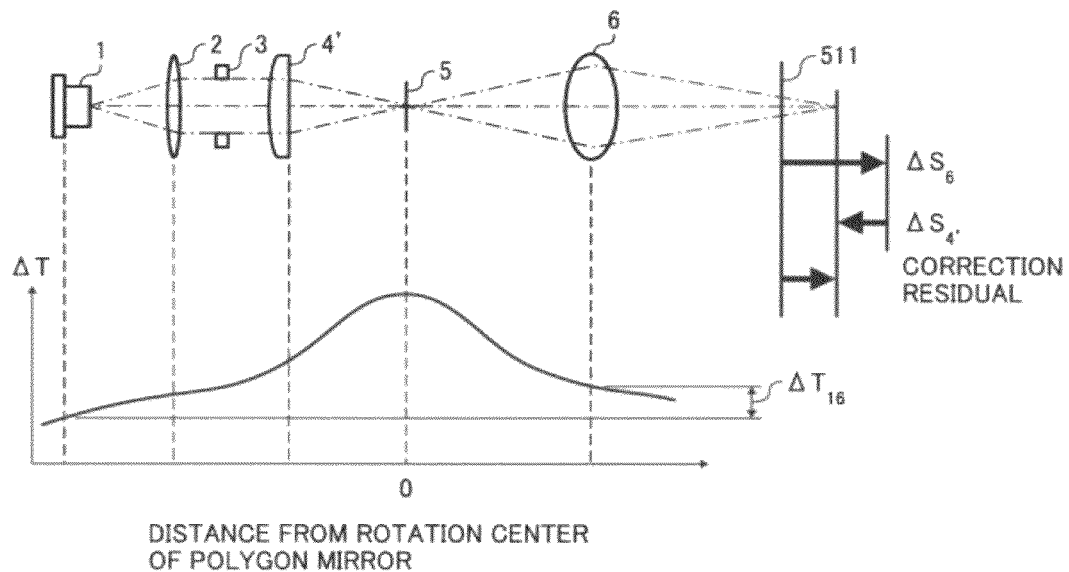

In this case, as shown in FIG. 10, the uneven temperature distribution is generated, and when the "temperature of the light source 1 does not so increase as the scanning lens 6", $|\Delta S_6|>|\Delta S_{4'}|$ is established and a "correction residual", i.e., the focus deviation amount not compensated, is generated. That is, the "temperature compensation" remains in an incomplete state, and thus, a temperature stability of the optical scanning device is threatened.

Figure 11:
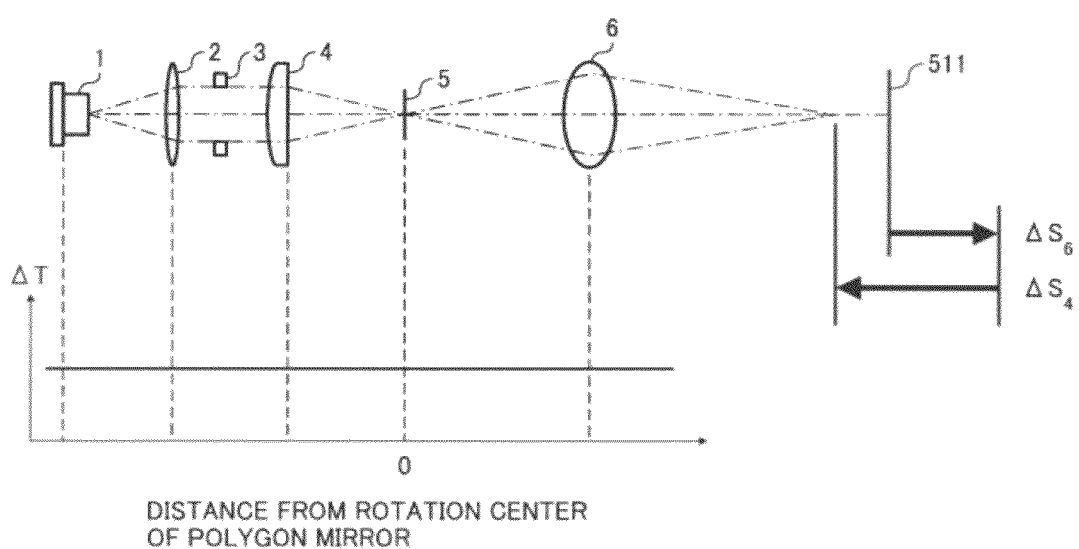

On the other hand, in the present embodiment, as shown in FIG. 11, in the diffractive lens 4, the power of the first surface of the diffractive surface (hereinafter, "correction power") is set such that when the temperature change is assumed to be even, the focus deviation amount $\Delta S_4$ resulting from the negative dispersion characteristic becomes excessive ($|\Delta S_6|<|\Delta S_4|$) for the focus deviation amount $\Delta S_6$ resulting from the power decrease of the scanning lens 6. That is, the diffractive lens 4 has a more excessive correction power than the conventional diffractive lens 4'.

Thus, when the uneven temperature distribution is generated, and the "temperature of the light source 1 does not so increase as the scanning lens 6", the "correction residual" becomes smaller than the conventional case, as shown in FIG. 12. A level of the excess of the correction power is determined by a size of the optical element, a temperature of the polygon mirror 5 when the optical scanning device is in operation, distances of the light source 1 and the scanning lens 6 each from the polygon mirror 5, a preliminary test or the like.

That is, in the present embodiment, a deterioration of a "temperature stability of the optical characteristic of the optical scanning device when in operation" resulting from a "nearly surely generated temperature distribution that is difficult to predict the amount" is changed to the "diffractive lens when the even temperature change is premised is designed to be excessive correction power" to reduce the "correction residual when the uneven temperature distribution is generated" more than the conventional case. Thus, it is suitable to realize the temperature stability of the optical scanning device having the polygon mirror, i.e., a strong heat source, by the diffractive lens.

FIG. 13 is a specific example of the focus deviation amount. In CASE1, instead of the diffractive lens 4, a cylindrical lens which has the same focal length and is made of glass is used, and the temperatures of the scanning lens 6 and the light source 1 as well increase by 20° C. In this case, when the scanning lens 6 made of resin is mainly thermally expanded, the focal length becomes long. As a result, a large focus position deviation is generated.

In CASE2, the diffractive lens 4 is used and the temperatures of the scanning lens 6 and the light source 1 as well increase by 20° C. In this case, the diffractive lens 4 has the excessive correction power, and thus, the focus position deviation is generated on an under side from an image surface. The focus deviation amount at this time is the "correction residual", and as compared to the CASE1, however, the focus deviation amount as such is reduced.

In CASE3, the diffractive lens 4 is used, and the temperature of the scanning lens 6 increases by 20° C. and that of the light source 1 increases by 17° C. When the diffractive lens 40 having a strong negative dispersion characteristic and the light source 1 having a temperature-oscillation wavelength characteristic of 0.2 nm/° C. are taken into consideration, the temperature difference of 3° C. is not necessarily small. In this case, as compared to CASE2, it can be seen as a "state that a shift amount of the oscillation wavelength in the light source 1 for the power decrease of the scanning lens 6 is insufficient". However, in the present embodiment, the diffractive lens 4 having the "excessive correction power (at the time of the even temperature change)" is used, and thus, the insufficient amount is compensated by the excessive correction amount to appropriately reduce the focus position deviation. In this way, in a layout where the polygonal mirror is a major heat source and the scanning lens is closer to the polygon mirror than the light source, an effect equivalent to that in the present embodiment can be constantly obtained.

As described above, the optical scanning device 900 includes the light source 1, the coupling lens 2, the diffractive lens 4, the polygon mirror 5, and the scanning optical system. The diffractive lens 4 has a diffractive surface so configured to obtain the excessive correction power for the power decrease of the scanning lens 6 at the time of the even temperature change. Thereby, even when the uneven temperature distribution in which the temperature of the scanning lens 6 is higher than that of the light source 1 is generated, the focus position deviation can be suppressed. Accordingly, a stable optical scanning can be enabled without incurring high cost.

When designing a lens system in the scanning optical system by a single scanning lens, if the scanning lens is located at a position apart from the polygon mirror, a greater length and a greater thickness cannot be avoided, and in addition, satisfying both speed uniformity and an imaging performance on the surface of the photosensitive drum becomes difficult. Thus, the single scanning lens is generally located in a position relatively close to the polygon mirror. However, when the scanning lens approaches the polygon mirror, the scanning lens is greatly affected by the heating of the polygon mirror, and therefore, a temperature difference between the scanning lens and the light source when the optical scanning device is in operation becomes large. That is, the uneven temperature distribution is generated, and thus, in the conventional diffractive lens, a large "correction residual" can probably be generated.

In the present embodiment, the lens system in the scanning optical system is configured by the single scanning lens. However, the diffractive lens 4, at the time of the even temperature change, has the diffractive surface capable of obtaining the excessive correction power for the power decrease of the scanning lens 6, and thus, even when the temperature difference between the light source and the scanning lens when the optical scanning device is in operation is large, the "correction residual" can be rendered small. That is, when the lens system in the scanning optical system is configured by the single scanning lens, a great effect can be obtained.

According to the present embodiment, the light flux from the light source 1 can be incident on the polygon mirror 5 without being flexed, and thus, an optical element that flexes the light flux, such as a reflection mirror, becomes unnecessary, thereby implementing lower cost. Accordingly, a reduction in component tolerance and assembly tolerance can be implemented.

According to the present embodiment, a shape of the diffractive surface of the diffractive lens 4 is multi-stepped, and thus, a transfer shape of the diffractive surface can be easily and accurately formed to a molding die (or a metal piece).

According to the present embodiment, the diffractive surface of the diffractive lens 4 is optically equivalent to a non-power surface, and thus, an optical performance is not easily deteriorated for eccentricity. As a result, a robust optical scanning device can be realized for a variation in components and assembly error.

According to the present embodiment, the diffractive lens 4 is made of resin, and thus, a highly accurate diffractive surface can be obtained at low cost.

According to the present embodiment, the light source, the pre optical system, the deflecting unit, and the scanning optical system are housed in the same casing, and thus, a fine adjustment of the position of the optical element is performed while the optical characteristic of the optical scanning device is fed back to keep an error possessed by the component and the optical element to a minimum, enabling the assembly. Particularly, when the component and the optical element are made of resin, shape accuracy is inferior to glass and metal, and thus, the adjustment is effective. That is, the optical scanning device can be manufactured while keeping an influence of the error appearing in the optical characteristic to a minimum.

With the configuration such that the first casing 14 and the second casing 15 are separated, a unit sharing in which the first casing 14, which serves as a unit for controlling the optical characteristic, is shared, and the second casing 15 is selected according to a layout of the photosensitive drum can be implemented, and as a result, various optical scanning devices can be configured. The sharing of the first casing 14 also is effective in lowering a price when various kinds of optical scanning devices are developed.

According to the present embodiment, a highly stable optical scanning device can be realized without increasing the number of components. This eliminates a need of increasing an amount of material to be used, the material being relating to production of the optical scanning device. As a result, increase in environmental load regarding output of resources and a discharge amount of plastic dust can be suppressed.

The laser printer 500 according to the present embodiment includes the optical scanning device 900 capable of performing a stable optical scanning without incurring high cost, and as a result, a high-quality image can be stably formed without incurring high cost.

In the present embodiment, the surface-emitting laser of the light source 1 can have a plurality of light-emitting units. In this case, a plurality of scanning are simultaneously enabled, and thus, a higher-speed image formation can be implemented.

In the present embodiment, while the case that the lens system in the scanning optical system is formed of the single scanning lens has been described, the configuration of the lens system is not limited thereto.

In the present embodiment, the case that when the diffractive surface is viewed along the optical axis direction, a figure drawn by the steps is linear in parallel to the main scanning direction is described, and however, in addition thereto, the figure drawn by the steps can be concentric circular or can be elliptical. The linear diffractive surface is one mode in which the effect of the diffractive surface is independently provided only in the sub-scanning direction.

Figure 14:
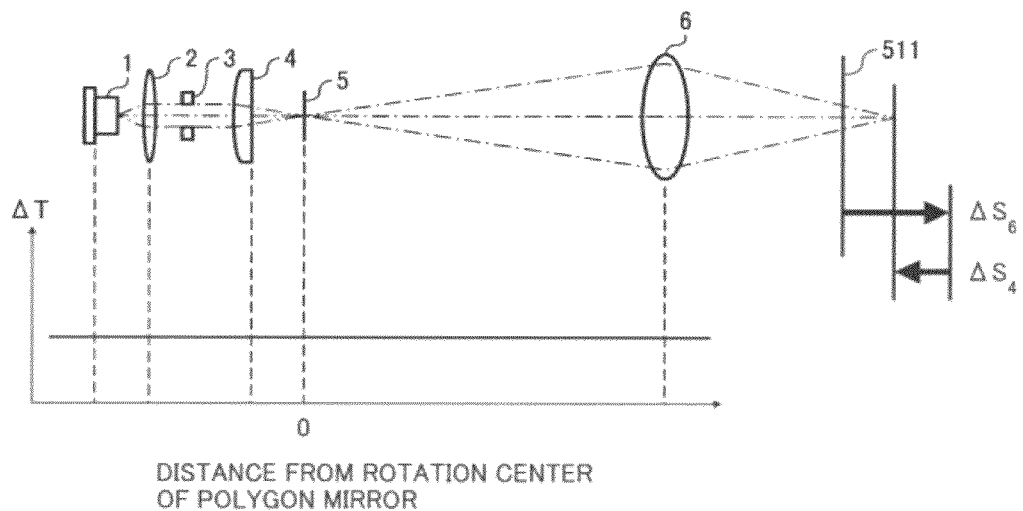
FIGS. 14 and 15 are schematic diagrams for explaining a diffractive lens when a temperature of a light source is higher than that of a scanning lens.
Figure 15:
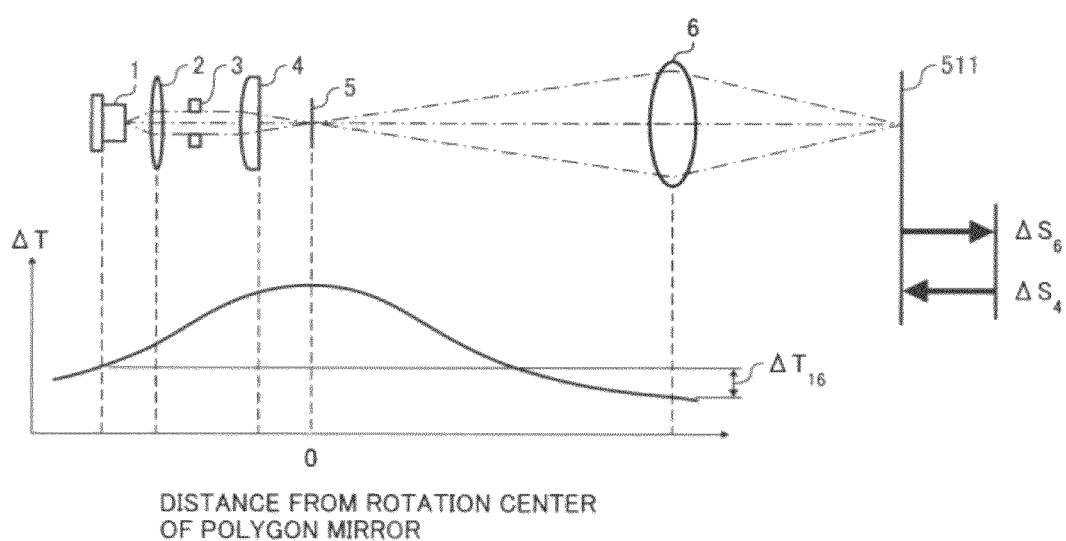

In the present embodiment, the case that the uneven temperature distribution in which the temperature of the scanning lens 6 is higher than that of the light source 1 is generated is described. In contrary, when an uneven temperature distribution in which the temperature of the light source 1 is higher than that of the scanning lens 6 is generated, the diffractive lens 4 can set the correction power of the diffractive surface such that when the temperature change is assumed to be even, the focus deviation amount $\Delta S_4$ resulting from the negative dispersion characteristic is insufficient ($|\Delta S_6|>|\Delta S_4|$) for the focus deviation amount $\Delta S_6$ resulting from the power decrease of the scanning lens 6 (see FIG. 14). Thereby, even when the uneven temperature distribution in which the temperature of the light source 1 is higher than that of the scanning lens 6 is generated, the focal position deviation can be suppressed (see FIG. 15).

In the present embodiment, the case of a direct transfer method, in which the transfer of the toner image from the photosensitive drum 511 onto the transfer paper P is directly performed from the photosensitive drum 511 to the transfer paper P, is described. However, the transfer can be performed by an intermediate transfer method, in which the toner image is once transferred from the photosensitive drum 511 onto an intermediate transfer medium such as an intermediate transfer belt, and then the image is transferred from the intermediate transfer medium to the transfer paper P.

In the present embodiment, the image carrier is drum-shaped. However, in addition thereto, the image carrier can be sheet-shaped or belt-shaped. For example, for a sheet-like photoconductor, zinc oxide paper can be used.

In the present embodiment, the case that the laser printer 500 is used as the image forming apparatus is described. However, the present invention is not limited thereto, and for example, an optical plotter or a digital copying machine can be used.

The image forming apparatus can use a silver halide film as the image carrier. In this case, the latent image is formed on the silver halide film by the optical scanning, and the latent image can be visualized by an equivalent process to a developing process in a general silver-halide photographic process. Further, with an equivalent process to a printing process in the general silver-halide photographic process, the latent image can be transferred to printing paper as an object to be transferred. Such an image forming apparatus can be implemented as an optical plate-making machine and an optical drawing device that draws a computerized-tomography (CT) scan image or the like.

The image forming apparatus can use a color developing medium (positive printing paper) that develops color due to thermal energy of the beam spot as the image carrier. In this case, a visual image can be directly formed on the image carrier by optical scanning.

In short, when an image forming apparatus including the optical scanning device 900 is used, a high-quality image can be stably formed without incurring high cost.

Even in an image forming apparatus that forms a color image, when an optical scanning device compatible with the color image is used, a high-quality image can be stably formed without incurring high cost.

Figure 16:
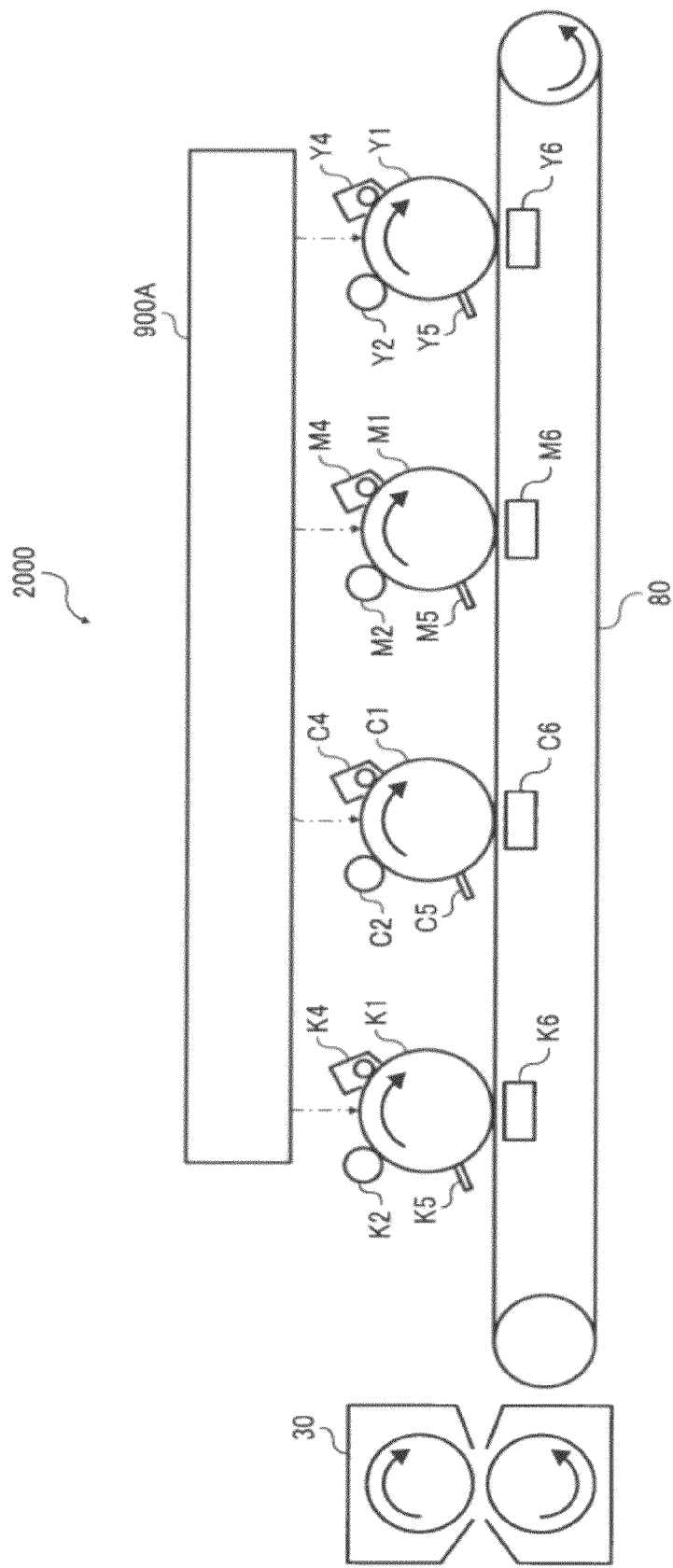
FIG. 16 is a schematic diagram for explaining a configuration of a tandem-type color copying machine.

As one example, a tandem-type color copying machine 2000 capable of forming a color image having multiple colors is shown in FIG. 16. The tandem-type color copying machine 2000 includes a photosensitive drum for black K1, a charger K2, a developer K4, a cleaning unit K5, a transfer-use charging unit K6, a photosensitive drum for cyan C1, a charger C2, a developer C4, a cleaning unit C5, a transfer-use charging unit C6, a photosensitive drum for magenta M1, a charger M2, a developer M4, a cleaning unit M5, a transfer-use charging unit M6, a photosensitive drum for yellow Y1, a charger Y2, a developer Y4, a cleaning unit Y5, a transfer-use charging unit Y6, an optical scanning device 900A, a transfer belt 80, and a fixing unit 30.

The optical scanning device 900A includes a polygon mirror, a light source for black, a pre optical system, a scanning optical system, a light source for cyan, a pre optical system, a scanning optical system, a light source for magenta, a pre optical system, a scanning optical system, a light source for yellow, a pre optical system, and a scanning optical system. Each pre optical system is similar to the pre optical system of the optical scanning device 900.

Around a circumference of each photosensitive drum, along a rotation direction (an arrow direction in FIG. 16) of the photosensitive drum, the corresponding charger, the developer, the transfer-use charging unit, and the cleaning unit are each located. Each charger evenly charges the surface of the corresponding photosensitive drum. The photosensitive drum surface charged by the charger is irradiated with a light flux by the optical scanning device 900A, and thereby, an electrostatic latent image is formed on the photosensitive drum. As a result, by the corresponding developer, a toner image is formed on the photosensitive drum surface. Further, by the corresponding transfer-use charging unit, the toner image of each color is transferred on recording paper. Finally, an image is fixed on the recording paper by the fixing unit 30. That is, the toner image of each color is transferred to and fixed on the same sheet-like recording medium, and the resultant material is synthesized to obtain a color image and a multiple-color image.

Each pre optical system of the optical scanning device 900A includes the diffractive lens. The diffractive lens has a diffractive surface so configured to obtain the excessive correction power for the power decrease of the corresponding scanning lens at the time of an even temperature change. Thereby, even when the uneven temperature distribution in which the temperature of the scanning lens is higher than that of the light source is generated, the focal position deviation can be suppressed. Accordingly, a stable optical scanning can be enabled without incurring high cost.

The tandem-type color copying machine 2000 includes the optical scanning device 900A, and thus, a variation of a beam spot diameter on each photosensitive drum surface can be suppressed. Accordingly, a variation in dot diameter of an output image can be suppressed, and thus, a high-quality image in which the dot diameters are uniform can be provided. When the beam spot diameter on the photosensitive drum surface is stabled, this means that one of a plurality of process control conditions is stabled. Accordingly, an execution frequency of process control can be reduced, and thus, reduction in environmental load, such as power saving, can be enabled.

In the present invention, the diffractive surface is set according to a magnitude relationship between a temperature of the scanning optical system and that of the light source when the optical scanning device is in operation such that when the temperatures of the scanning optical system and the light source are assumed to be equal to each other, a deviation amount of an in-focus position of a light flux by at least one diffractive optical element is rendered larger or smaller than the deviation amount for canceling the deviation amount of the in-focus position of the light flux by the scanning optical system. Accordingly, when the optical scanning device is in operation, even when the temperature of the scanning optical system and that of the light source differ from each other, a residual of the deviation of the in-focus position resulting from the temperature difference can be rendered smaller than the conventional case. As a result, this enables a stable optical scanning without incurring high cost.

Because at least one optical scanning device of the present invention is included, as a result, a high-quality image can be stably formed without incurring high cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface via a light flux, the optical scanning device comprising:
   a light source that emits a light flux;
   a pre optical system that is located on an optical path of the light flux from the light source and that includes at least one diffractive optical element having a diffractive surface on at least one side;
   a deflecting unit that deflects the light flux output from the pre optical system; and
   at least one scanning lens that focuses the light flux deflected by the deflecting unit on the scanning surface,
   wherein when an overall temperature of the optical scanning device rises during operation thereof, a temperature rise of the light source is smaller than a temperature rise of a scanning lens that is closest to the deflecting unit, and
   wherein a power of the diffractive surface is set such that if the temperature rise of the light source and the temperature rise of the scanning lens are assumed to be equal, a deviation amount of an in-focus position of the light flux via the diffractive optical element caused by the overall temperature rise is larger than a deviation amount of an in-focus position of the light flux via the scanning lens caused by the overall temperature rise.

2. The optical scanning device according to claim 1, wherein the deviation amount of the in-focus position of the light flux via the diffractive optical element cancels the deviation amount of the in-focus position of the light flux via the scanning lens.

3. The optical scanning device according to claim 2, wherein the light flux from the light source is incident on the deflecting unit without being reflected.

4. The optical scanning device according to claim 1, wherein the at least one scanning lens is a single scanning lens.

5. The optical scanning device according to claim 1, wherein the diffractive surface has a multi-stepped shape.

6. The optical scanning device according to claim 1, wherein the diffractive optical element comprises resin.

7. The optical scanning device according to claim 1, further comprising:
   a scanning optical system including
      the at least one scanning lens on which the light flux deflected by the deflecting unit is incident, and
      a mirror system that guides the light flux output from the at least one scanning lens to the scanning surface;
   a first casing in which the light source, the pre optical system, the deflecting unit, and the at least one scanning lens are housed; and
   a second casing in which the mirror system is housed.

8. An image forming apparatus comprising:
   at least one image carrier; and
   at least one optical scanning device that scans the image carrier via a light flux including image information, the optical scanning device including
      a light source that emits the light flux,
      a pre optical system that is located on an optical path of the light flux from the light source and that includes at least one diffractive optical element having a diffractive surface on at least one side,
      a deflecting unit that deflects the light flux output from the pre optical system, and
      at least one scanning lens that focuses the light flux deflected by the deflecting unit on the scanning surface,
   wherein when an overall temperature of the optical scanning device rises during operation thereof, a temperature rise of the light source is smaller than a temperature rise of a scanning lens that is closest to the deflecting unit, and
   wherein a power of the diffractive surface is set such that if the temperature rise of the light source and the temperature rise of the scanning lens are assumed to be equal, a deviation amount of an in-focus position of the light flux via the diffractive optical element caused by the overall temperature rise is larger than a deviation amount of an in-focus position of the light flux via the scanning lens caused by the overall temperature rise.

9. The image forming apparatus according to claim 8, wherein the image information is color image information.

10. The optical scanning device according to claim 1, wherein the diffractive surface is concave such that each symmetrical half of the concave diffractive surface has a multi-stepped shape including successive steps, each step having a planar portion that is parallel to a central surface portion of the diffractive surface.

11. The optical scanning device according to claim 10, wherein a distance between the planar portion of each successive step of the multi-stepped shape is approximately 1.2 μm.

12. The optical scanning device according to claim 10, wherein a distance between the planar portion of each step of the multi-stepped shape and a central portion of the diffractive surface increases with each successive step, the distance being measured in a direction perpendicular to the planar portion of each step, and
   wherein first stepped surfaces of successive steps are parallel to each other, and second surfaces, which connect successive first stepped surfaces, are perpendicular to adjacent first stepped surfaces.

13. The image forming apparatus according to claim 8, wherein the diffractive surface is concave such that each symmetrical half of the concave diffractive surface has a multi-stepped shape including successive steps, each step having a planar portion that is parallel to a central surface portion of the diffractive surface.

14. The image forming apparatus according to claim 13, wherein a distance between the planar portion of each successive step of the multi-stepped shape is approximately 1.2 μm.

15. The image forming apparatus according to claim 13, wherein a distance between the planar portion of each step of the multi-stepped shape and a central portion of the diffractive surface increases with each successive step, the distance being measured in a direction perpendicular to the planar portion of each step, and
   wherein first stepped surfaces of successive steps are parallel to each other, and second surfaces, which connect successive first stepped surfaces, are perpendicular to adjacent first stepped surfaces.

* * * * *